(No Model.)
G. W. WALTZ.
ROOFING.
No. 344,228. Patented June 22, 1886.
Fig. 1.
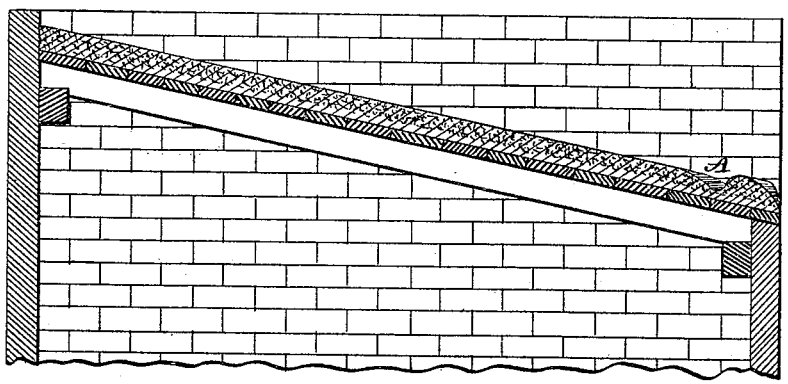
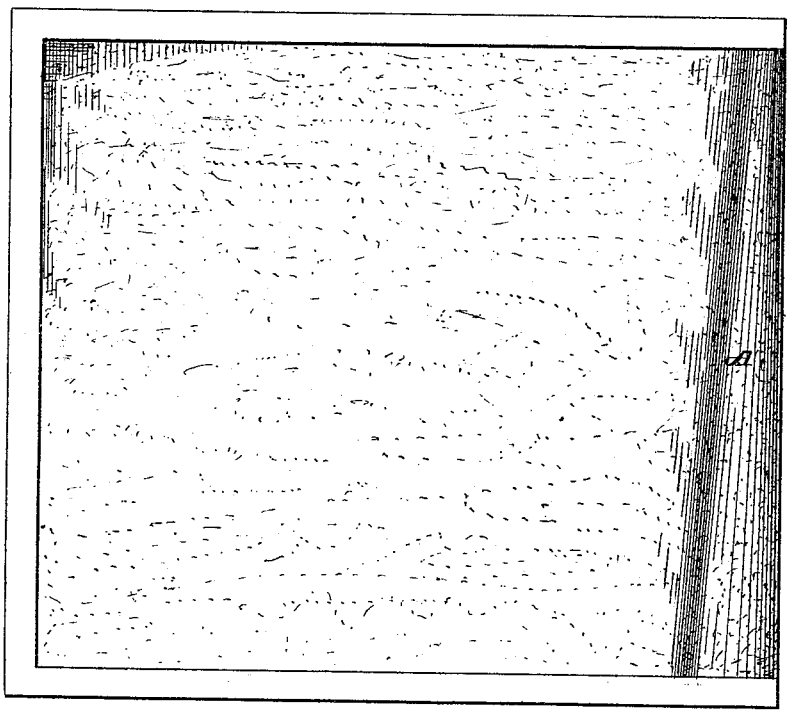
Fig. 2.
Witnesses
Percy C. Bowen
E. C. Siggers
Inventor,
George W. Waltz
By his Attorneys
C. A. Snowden

UNITED STATES PATENT OFFICE.

GEORGE WASHINGTON WALTZ, OF BLISSFIELD, MICHIGAN, ASSIGNOR OF ONE-HALF TO SHUBAEL R. BERRINGER, OF SAME PLACE.

ROOFING.

SPECIFICATION forming part of Letters Patent No. 344,228, dated June 22, 1886.

Application filed March 4, 1886. Serial No. 191,047. (No model.)

*To all whom it may concern:*

Be it known that I, GEORGE WASHINGTON WALTZ, a citizen of the United States, residing at Blissfield, in the county of Lenawee and State of Michigan, have invented a new and useful Improvement in Roofing, of which the following is a specification, reference being had to the accompanying drawings.

My invention relates to an improvement in roofing compounds composed of water, lime, and sawdust; and it further consists of a roof formed of plastic cement, having a gutter or eaves-trough formed in the outer edge of the roof for conveying the water therefrom, as will be more fully set forth hereinafter.

In the drawings, Figure 1 is a vertical section of a roof constructed according to my improved method. Fig. 2 is a top plan view of the same.

A quantity of water-lime is mixed with water and thinned to the proper consistency and applied to the roofing boards or cover with a whitewash-brush as a priming-coat. When dry, a coat of cement, composed of equal parts of water, lime, and sawdust, by measurement, is applied over the priming-coat and smoothed thereon, and the said coat of cement is made of any desired thickness. When dry, it is a buff color, and can be painted any color desired. A cement thus composed hardens with age, is both water and fire proof, is extremely durable, and practically indestructible, forming a roofing compound which is cheap and simple, easily applied, and thoroughly efficient.

The presence of sawdust in the cement enables the roofing-boards to shrink or expand under varying conditions of the atmosphere without effecting the cement and cracking the same.

While the cement is yet in a plastic condition, after being applied to the roof, a channel or furrow, A, is formed therein at the outer edge, thereby forming a water-course answering every practical purpose for which gutters or eaves-troughs are commonly employed. This channel or furrow is slightly diagonal on the roof, so as to give it sufficient inclination to cause all the water to run off.

Having thus described my invention, I claim—

1. The method of covering roofs, consisting in applying a coat (one or more) of suitable cement thereon, and forming drain-channels therein while the cement is in a plastic condition, for the purpose set forth, substantially as described.

2. As a new article of manufacture, a roof composed of cement, and having a drain-channel formed therein, substantially as described.

In testimony that I claim the foregoing as my own I have hereto affixed my signature in presence of two witnesses.

GEORGE WASHINGTON WALTZ.

Witnesses:
 J. CARPENTER,
 ENOS M. PARTEE.